United States Patent [19]

Martinez et al.

[11] Patent Number: 5,376,938
[45] Date of Patent: Dec. 27, 1994

[54] METHOD AND APPARATUS FOR MAINTAINING LINEARITY AND FREQUENCY ACCURACY OF AN FM CHIRP WAVEFORM

[75] Inventors: Roger I. Martinez, Ridgecrest; Michael L. Sanders, Inyokern; John H. Ashton, Ridgecrest, all of Calif.

[73] Assignee: The United States of America as represented by the Secretary of the Navy, Washington, D.C.

[21] Appl. No.: 224,611

[22] Filed: Apr. 4, 1994

[51] Int. Cl.$^5$ ............................................. G01S 7/40
[52] U.S. Cl. ................................. 342/128; 342/132; 342/173
[58] Field of Search ............... 342/128, 132, 173, 174, 342/200, 201

[56] References Cited

U.S. PATENT DOCUMENTS

| | | |
|---|---|---|
| 4,539,565 | 9/1985 | Norsworthy ..................... 342/128 |
| 5,189,427 | 2/1993 | Stove et al. ..................... 342/128 |
| 5,252,981 | 10/1993 | Grein et al. ..................... 342/200 |
| 5,291,200 | 3/1994 | Lo ..................... 342/13 |

Primary Examiner—Mark Hellner
Attorney, Agent, or Firm—Harvey A. Gilbert; Melvin J. Sliwka; Forrest, Jr. John L.

[57] ABSTRACT

A homodyne radar apparatus and method for performing radar cross-section measurement by maintaining the linearity and compensating for frequency drift of an FM chirp waveform produced by a YIG tuned oscillator. A digital computer uses a predetermined data look-up table of each YIG oscillator frequency characteristic in conjunction with a digital to analog converter to provide a compensating sweep signal to linearize the frequency output of the oscillator. The computer uses an analog to digital converter in conjunction with a reference circuit output to compare the actual YIG signal nulls resulting from the reference circuit to the nulls in a signal produced by a lab standard oscillator in the reference circuit to adjust start sample delay of the ADC and to correct any frequency drift evidenced by the difference in the null of the signal.

10 Claims, 7 Drawing Sheets

METHOD AND APPARATUS FOR MAINTAINING LINEARITY AND FREQUENCY ACCURACY OF AN FM CHIRP WAVEFORM

FIELD OF THE INVENTION

The present invention is related to radar cross-section measurements and more particularly to an apparatus and method for improving the accuracy and speed of obtaining the radar cross-section magnitude and phase data.

BACKGROUND OF THE INVENTION

In a typical coherent Radar Cross Section (RCS) measurement, the magnitude and phase of the target return is collected over a range of frequencies. The frequency source is swept linearly over a band of frequencies, producing a linear-FM or "chirp" waveform. If high quality RCS data is required, there are two parameters of the chirp waveform (sweep) that must be closely controlled: linearity and frequency accuracy. Linearity is a function of each individual chirp. It describes the variation in the rate of change of frequency during the chirp. Ideally, the chirp will be perfectly linear, that is, a plot of frequency versus time will result in a straight line. A very linear chirp is required if the data is to be processed by a Fast Fourier Transform (FFT) algorithm (i.e. imaging). Processing non-linear data will result in a loss of resolution and focus. Frequency accuracy is a measure of sweep-to-sweep variations in the chirp waveform. Ideally, each chirp will be identical, that is, the oscillator will tune through the same frequencies each sweep. Frequency accuracy is very important if data from multiple sweeps is to be compared (i.e. radar cross section vs. angle plots).

For applications in the microwave frequencies, the YIG-Tuned Oscillator (YTO) is the most common frequency source. The YTO has many desirable features. It is small, inexpensive, broadband, fairly linear, has very repeatable sweep-to-sweep tuning characteristics, high output power, can change frequency quickly, and can be easily and accurately tuned with an analog voltage.

In order to provide a higher degree of linearity and frequency accuracy, the YTO is usually placed in a Phase Locked Loop (PLL) circuit to form a frequency synthesizer. A synthesizer can produce very accurate and repeatable frequencies. However, a finite amount of time is needed for the synthesizer to attain phase-lock. This time can often be in the range of 10-30 milliseconds. This drastically slows the rate at which data can be taken. For example, a fully phase-locked sweep of 128 points over a 6-18 Ghz bandwidth could take as much as 5 seconds to complete. Without the PLL, the YTO could tune over this bandwidth in as little as 20 milliseconds, about 250 times faster. One approach to improving the sweep speed involves only phase locking to the first frequency in the sweep. A synthesizer sweeping in this fashion could probably produce the above 6-18 Ghz sweep in about 50 milliseconds. This a sizable improvement, but, because there is no phase lock, linearity and frequency accuracy are sacrificed, the very reasons the synthesizer was used in the first place. Sweeptime is of interest because of the large amount of data required for accurate radar cross-section measurement and imaging.

In order to achieve faster sweep speeds and lower the cost, complexity, and size of the frequency source, the YTO is run "open loop", not phase-locked. This allows the radar to sweep a 12 Ghz bandwidth in about 20 milliseconds. Faster speeds are possible. Although YTO's are fairly linear devices they are not as linear as necessary for accurate and repeatable radar cross-section measurements.

SUMMARY OF THE INVENTION

It is thus an object of the present invention to provide an apparatus and method for producing high quality, coherent, radar cross section (RCS) data, without using phase-locked-loop technology.

It is another object of the present invention to provide an apparatus and method for producing high quality, coherent, radar cross section data, using a linear-FM chirp that maintains a high level of linearity and frequency accuracy.

It is yet another object of the present invention to provide an apparatus and method for producing high quality, coherent, radar cross-section data, using a YIG-tuned oscillator (YTO) to produce a linear FM chirp that maximizes the speed, linearity, and frequency accuracy of the chirp.

It is still another object of the present invention to provide an apparatus and method for producing high quality, coherent, radar cross-section data by measurement of and compensation for the linearity and frequency errors in the YTO sweep characteristic.

The present invention employs a YTO operated open-loop to achieve faster linear sweep speeds than are possible using phase-locked-loop control. The frequency characteristic or fingerprint of each YIG oscillator selected for use is precisely and accurately predetermined in a laboratory setup. The variance of the fingerprint from the linear ideal characteristic desired is determined. The present invention uses this variance information to provide computer produced compensation by deforming the oscillator tuning voltage waveform to produce the desired linear oscillator frequency sweep.

The apparatus of the present invention is implemented in a linear-FM homodyne radar design comprising in part a computer, and a YIG oscillator which is driven by a compensating sweep voltage supplied by the computer to produce a repeatable linear-FM chirp. The linear-FM chirp has a maximum of frequency accuracy necessary for producing high quality coherent radar cross-section data without using phase-locked loop control. A frequency reference circuit that has a known frequency response determined with a network analyzer in laboratory measurements is used for comparing the frequency of the YIG oscillator signal in the reference circuit to the lab determined response of the circuit stored in the computer. Any drift in the oscillator frequency is then corrected by the computer by adjusting the Start Sample Delay of the ADC in the computer at the appropriate time in the sweep voltage ramp. Computer-controlled linear sweep compensation and frequency drift correction provided by the apparatus of the present invention permits the high-speed acquisition of accurate RCS data not otherwise obtainable by other currently used apparatus and methodologies.

DETAILED DESCRIPTION

Figure 1:
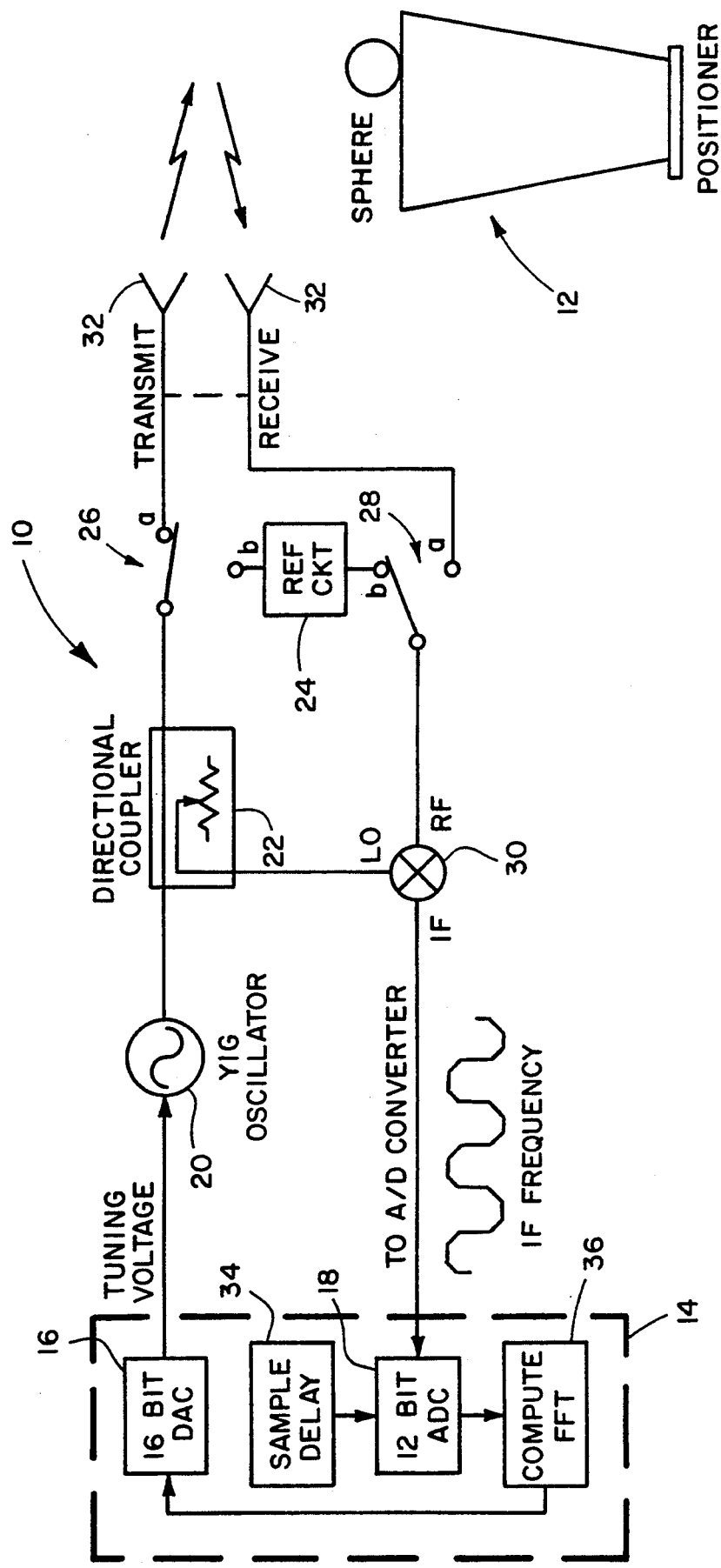
FIG. 1 is a simplified schematic block diagram of the apparatus of the invention.
Figure 2:
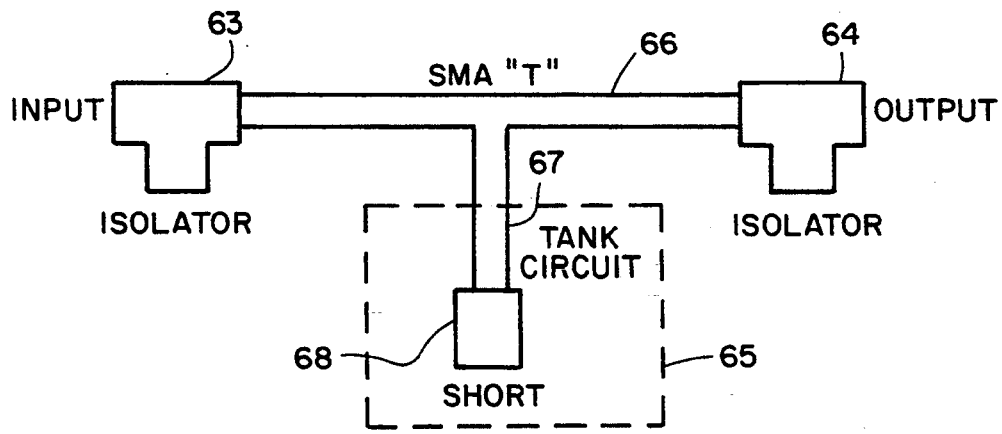
FIG. 2 is a diagram of the reference circuit.

Referring to FIG. 1 the present invention embodied as the radar 10 is shown irradiating a target 12. The radar 10 is comprised of the computer 14 connected via the 16 bit digital to analog converter 16 to the YIG oscillator 20 which connects to the directional coupler 22. The directional coupler 22 connects to the switch arm of the first RF switch 26 and separately to the local oscillator input to the mixer 30. The switch arm of the RF switch 26 can connect to terminal "a" of the switch which in turn connects to the transmit feed to antenna 32 or to terminal "b" of the switch 26 which connects to the input to reference circuit 24. The details of the reference circuit 24 are depicted in FIG. 2. The reference 24 consists of the isolators 63 and 64 joined by the coax segment 66 and the tank circuit 65 comprising the short 68 and the coax segment 67 joined to coax segment 66 by means of coax segment 67. Referring back to FIG. 1, the output of the reference circuit 24 connects to the "b" terminal of the second RF switch 28. The "a" terminal of RF switch 28 connects to the receive line from antenna 32. The switch arm of the RF switch 28 connects to the RF terminal of the mixer 30 which in turn connects via its intermediate frequency (IF) output to the analog to digital converter 18 in the computer 14.

The computer 14 contains a means 34 for delaying the start of the frequency bandwidth sample connected to the analog to digital converter 18 and a means for processing the raw digitized data by Fast Fourier Transform (FFT) to compute the magnitude and phase components for each frequency in the sweep. The FFT calculations were performed by a tool in the software package used to implement various algorithms in the computer 14.

Figure 3:
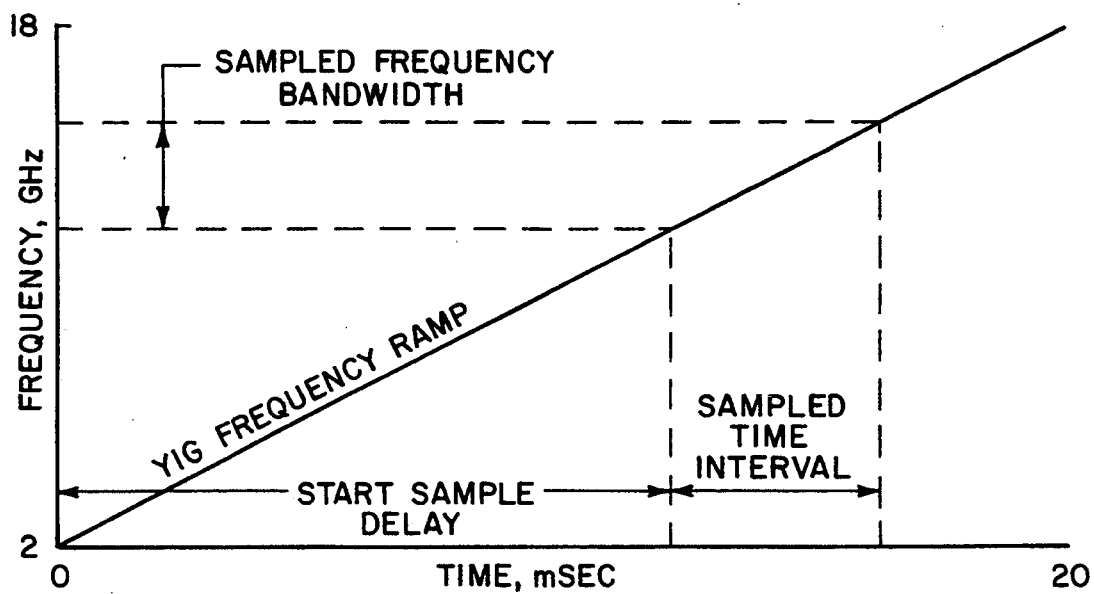
FIG. 3 is a graph depicting the relationship of frequency to sampling time.

FIG. 3 shows the relationship between the sample frequency bandwidth and the sample time interval for a linear YIG frequency ramp that is user selectable where less than the entire frequency bandwidth of the YTO is being used.

Figure 4:
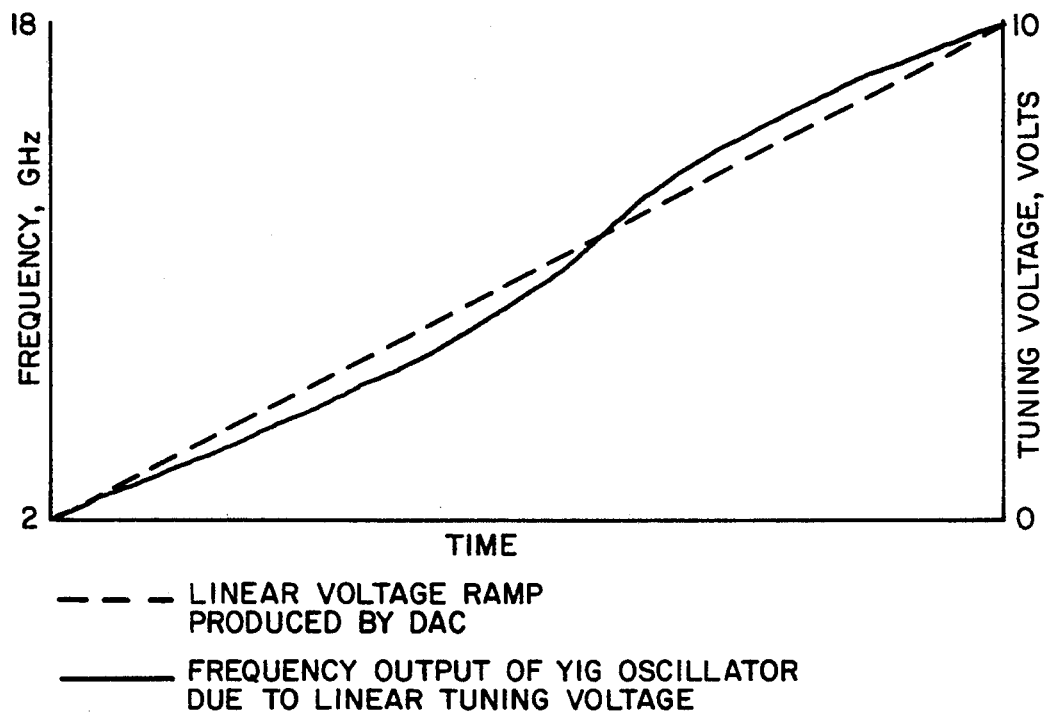
FIG. 4 is a graph of YIG oscillator frequency output due to linear tuning voltage.

FIG. 4 shows the frequency versus time characteristic of a YIG oscillator which is almost but not quite linear when a linear voltage ramp is provided by the digital to analog converter 16 in computer 14 to sweep the YIG over the bandwidth of interest. It is this small but significant non-linearity that the present invention compensates for in combination with compensation for unacceptable frequency drift.

Figure 5:
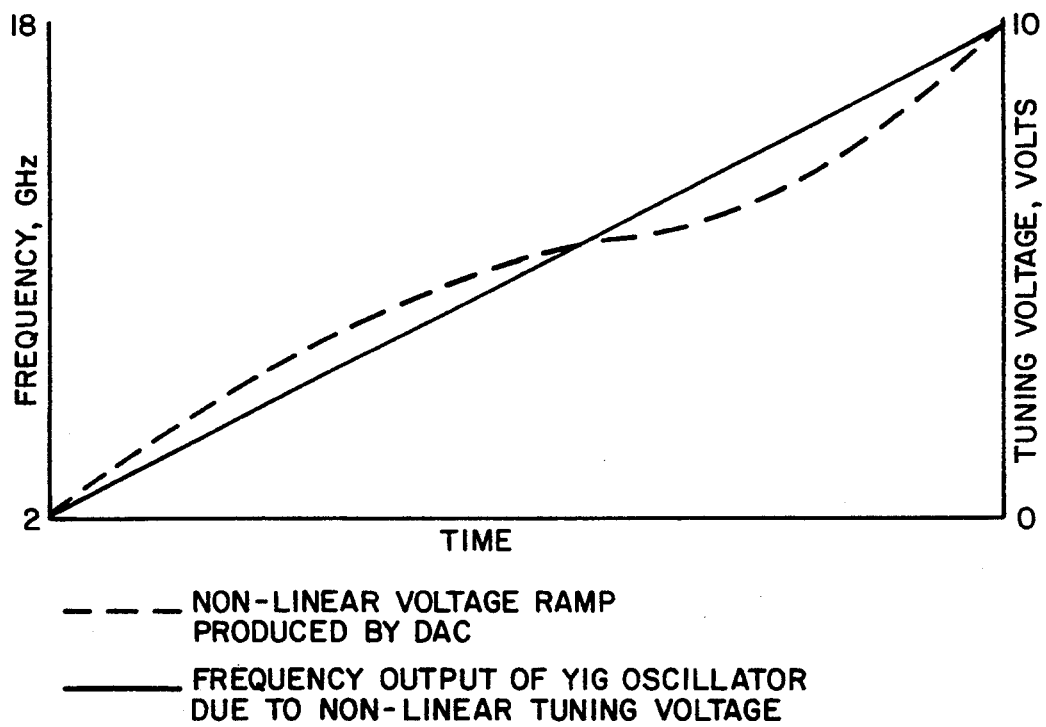
FIG. 5 is a graph of linear frequency output of YIG oscillator due to non-linear tuning voltage.

FIG. 5 shows the non-linear voltage ramp that would be required as an output of the digital to analog converter 16 to compensate for the inherent non-linearity of the YIG oscillator. A linear YTO frequency output is thus shown to result from the use of a non-linear compensating voltage ramp produced by the digital to analog converter 16 for each non-linear YIG oscillator characteristic. The specific compensation required depends on the characteristics of each YIG oscillator.

Linearity Compensation

Figure 6:
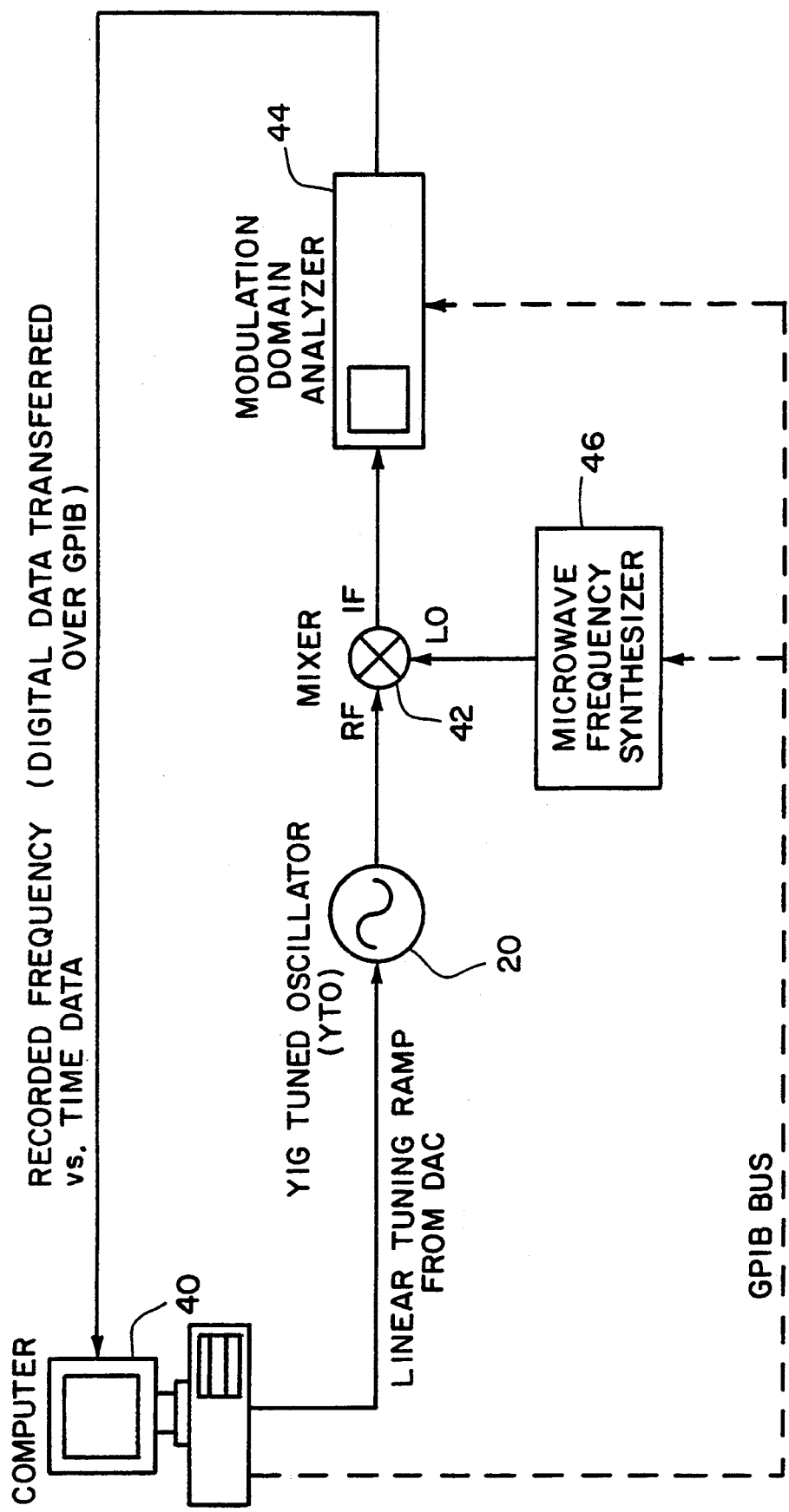
FIG. 6 is a block diagram depicting measurement of YIG oscillator tuning characteristic.

To determine the linearity compensation needed for a particular YIG oscillator, the test setup depicted in FIG. 6 is used. A computer 40 configured the same as the computer 14 in the operational implementation of the invention and containing a digital to analog converter (DAC) is connected to a YIG-tuned Oscillator (YTO) 20 to determine its characteristic or frequency output signature. The oscillator 20 is installed on an appropriate heat sink so that it can be evaluated under thermal conditions prevailing in its operating environment.

A linear voltage ramp is normally used to sweep a YIG tuned oscillator (YTO). The YTO generally will produce a substantially linear output when a linear ramp input sweep is applied. To improve the linearity further, the lab setup of FIG. 6 provides a very linear tuning ramp from a digital to analog converter (DAC) internal to the computer 40 to the YIG-tuned oscillator 20 for which the output frequency response is sought. The DAC in the computer 20 tunes the oscillator 20 over it's entire bandwidth at it's normal operating speed. In a preferred embodiment this was 6–18 Ghz in 20 milliseconds.

The output of YIG-tuned oscillator 20 is fed to the RF port of mixer 42. A local oscillator signal input to the mixer 42 is provided by the microwave frequency synthesizer 46 to produce an IF signal mixer output. A computer algorithm computes the synthesizer 46 frequency based on the last measured frequency so that the synthesizer frequency supplied to the mixer 42 yields an IF frequency in the passband of the modulation domain analyzer (MDA) 44. The IF signal from the mixer 42 is input to the modulation domain analyzer (MDA) 44. The MDA is supplied with a trigger from the computer 40 in FIG. 6 at the beginning of each sweep. A computer algorithm computes the delay for the MDA until the YTO sweeps the frequency segment of interest. The Full-Band Measurement subroutine also includes an algorithm that permits alignment of frequency versus time data from the MDA to compensate for the measurement interval, i.e. to offset the times by half the measurement interval for the times and frequencies to align properly. The MDA 44 produces frequency versus time data representing the actual frequency response of the oscillator 20 to the linear ramp input from the computer 40. This frequency response is typically different for each oscillator of the same kind. It is the characteristic or signature unique to each oscillator. Each such response or characteristic is somewhat non-linear when compared with the ideal linear ramp input from the computer 40. Thus, this data representing the characteristic or signature of each oscillator is obtained as a stream of digital data over the GPIB interface to the computer 40 from the analyzer 44. The computer 40 uses an internal GPIB interface to read the data obtained for each oscillator. The computer 40 calculates the data to compensate for the oscillator non-linearities, that is, the difference between the non-linear YIG oscillator characteristic and the ideal linear characteristic, and stores this data for each oscillator in a look-up table. The data from the table for a particular oscillator is used to produce an analog sweep signal output from the digital to analog converter in the computer 40 to drive the oscillator 20 to which it relates, to produce a more linear output than obtained without the sweep compensation.

More specifically, with reference to FIG. 6, since the modulation domain analyzer (MDA) 44 has an input bandwidth of 100 Mhz to 2 Ghz, the frequency synthesizer 46 and the mixer 42 are used to down-convert a segment of the sweep at a time.

After the data for each segment is recorded by the computer 40, the synthesizer 46 is automatically reprogrammed to down-convert the next segment. This process is repeated until data has been recorded for the entire tuning bandwidth of the oscillator 20. A computer algorithm compares the recorded data to an ideal frequency ramp and computes a non-linear tuning waveform that will produce the most linear frequency sweep. The entire process can be iterated several times to optimize the waveform. This data is stored in a file as a series of digital values associated with the particular oscillator. The stored data is used to program the DAC 20 in the computer 40 to generate the optimum tuning waveform. Using the tuning slope thus calculated and the min and max frequencies measured by the MDA 44, the chirp deviation algorithm computes an ideal linear ramp and then compares the measured data to the ideal ramp and calculates the deviation. Another algorithm in the same subroutine uses the chirp deviation to compute the new DAC levels that will compensate for the deviation.

The frequency versus time information collected by the MDA 44 can also be stored in a look-up table and used to more accurately choose the correct ADC Start Sample Delay for a particular frequency bandwidth. This compensation is computed once for each oscillator. Tests have indicated that this compensation is very stable over time. Changes in temperature produce an offset in the tuning characteristic over the entire band. This error is treated as a frequency accuracy error and is corrected by another algorithm, using the reference circuit.

The Reference Circuit Operation

Figure 7:
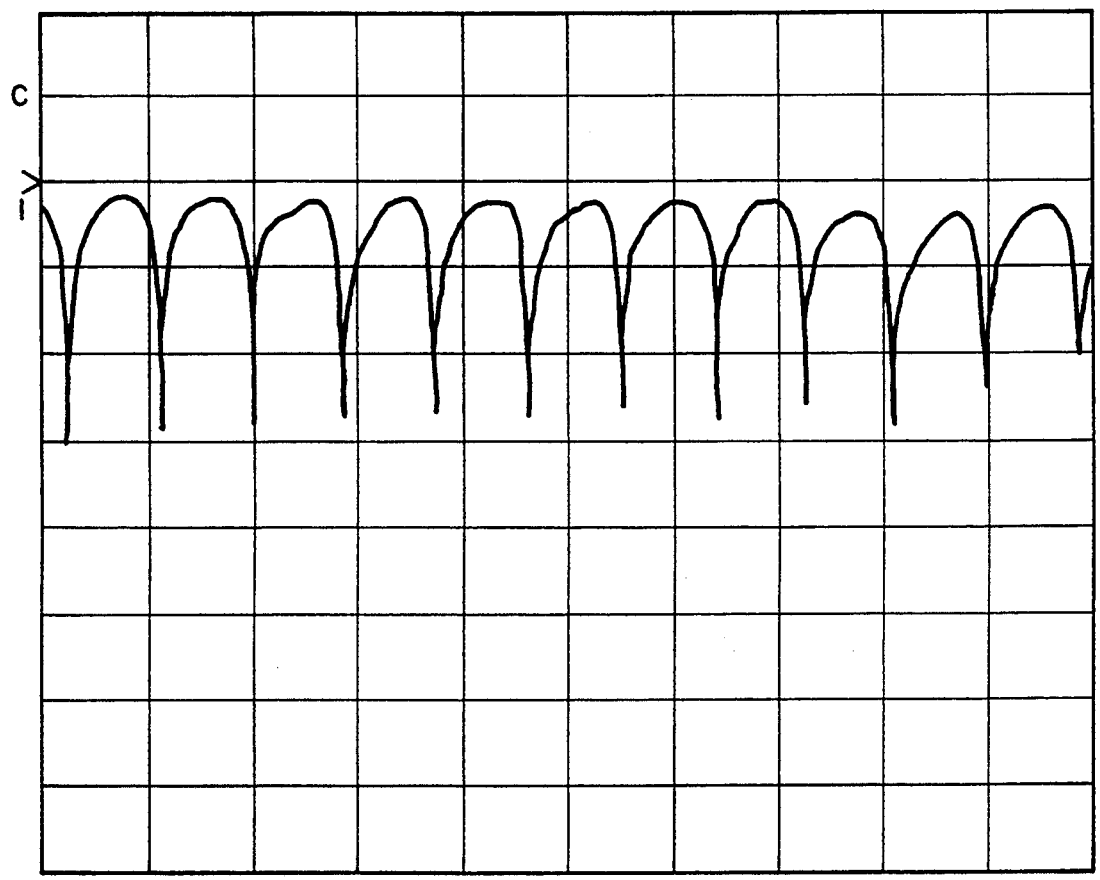
FIG. 7 is a graphic representation of the nulls of the reference circuit of the invention.

The reference circuit 24 in FIG. 1 is a resonant circuit designed to have many nulls in it's frequency response. See also FIG. 2. The circuit 24 consists of a coax "T" with two isolators 63 and 64, one in each arm of the "T" and a tank circuit 65 comprised of a shorted coax segment 67 in the leg of the "T". It is necessary to have at least one null in each frequency band or segment over which data is being taken. The frequency response of the reference circuit 24 is carefully measured on a laboratory network analyzer (See FIG. 7) and the frequencies of the nulls are stored in a look-up table in the computer 40. This data table is then stored in the computer 14 for use during radar cross-section measurements. To determine if the YIG tuned oscillator has drifted in frequency during the RCS measurements, the radar 10 measures the response of the reference circuit 24. An algorithm stored in the computer 14 searches for a predetermined null in the look-up table also stored in the computer 14 and compares the measured frequency during the RCS measurement with the data in the look-up table. Because the oscillator 20 is tuned linearly across the frequency band or segment of interest, a particular frequency in the sweep can be mapped to a time delay from the beginning of the sweep. See FIG. 3. The entire sampled frequency bandwidth can, therefore, be directly mapped to a sampled time interval.

Since the YIG tuned oscillator 20 is tuned and compensated to produce a very linear frequency sweep, an error in the location of the null will translate to a frequency offset over the entire sampled frequency bandwidth during the RCS measurements. By modifying the start sample delay on the analog to digital converter 18 in the computer 14, the sampled frequency bandwidth can be aligned so that the reference circuit 24 response is mapped to the correct frequencies.

One Preferred Embodiment

Figure 8A:
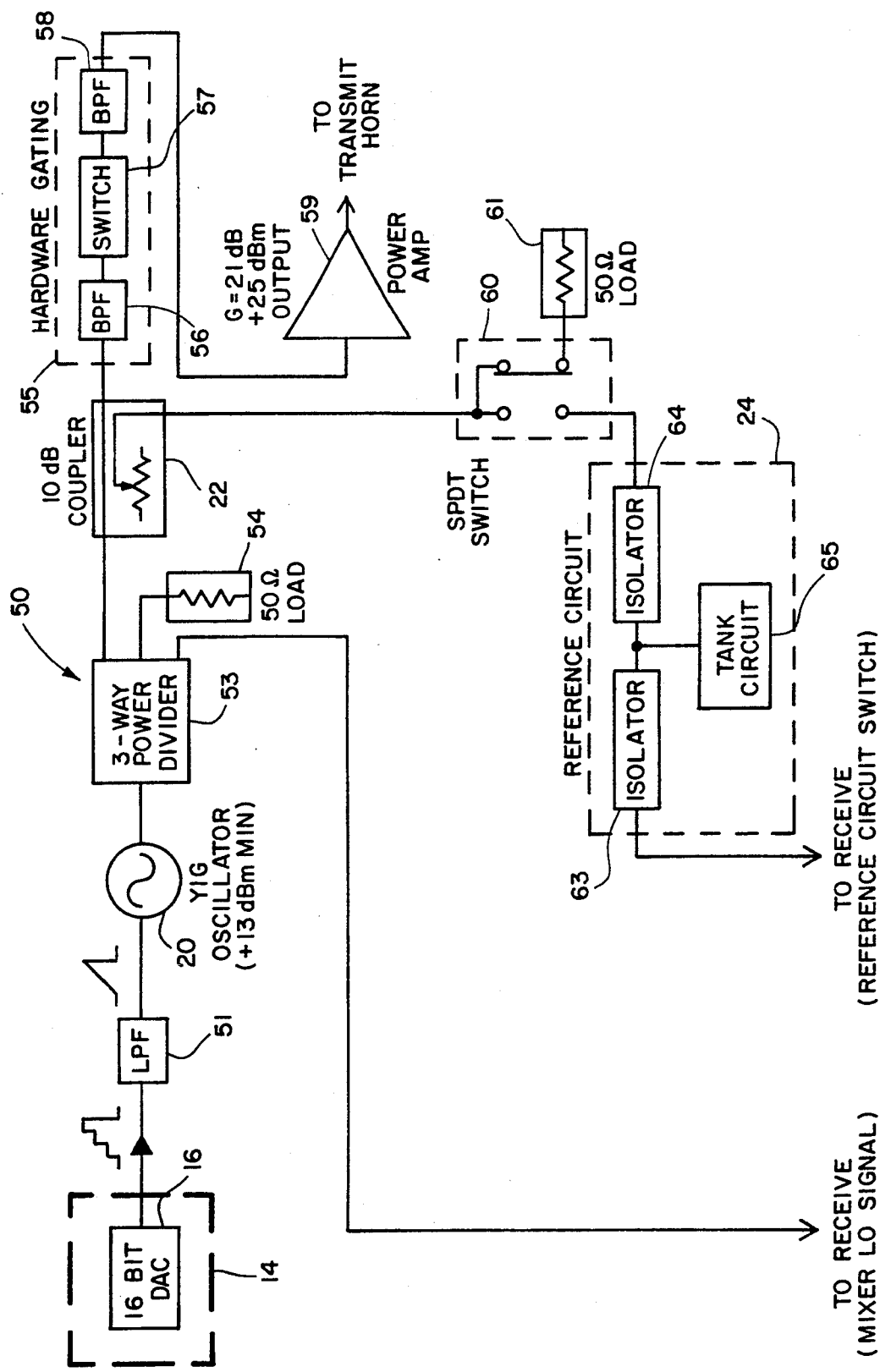
FIG. 8A is a schematic block diagram of the transmit section of one embodiment of the present invention.
Figure 8B:
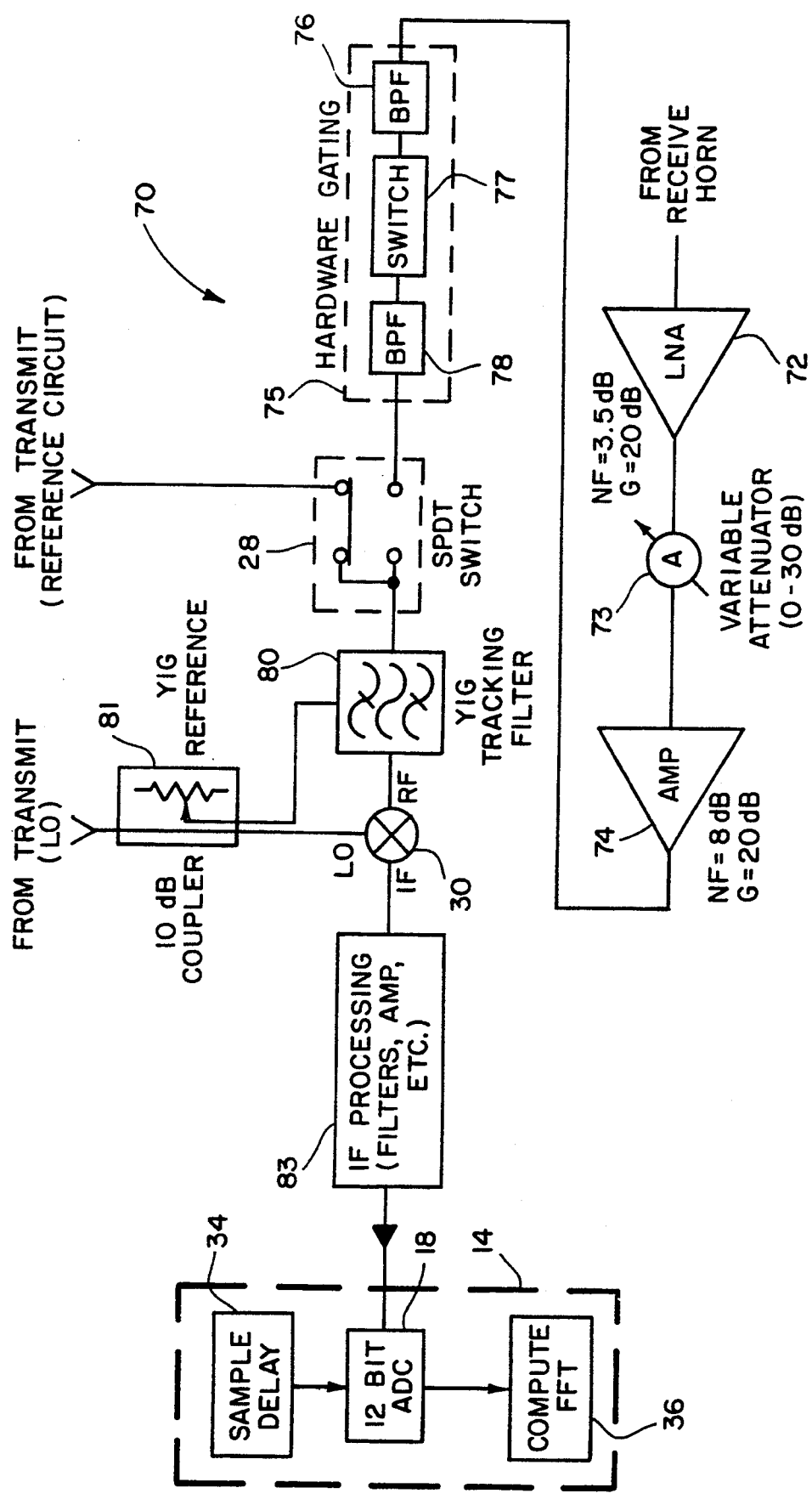
FIG. 8B is a schematic block diagram of the receive section of the FIG. 8A embodiment.

One embodiment of the present invention is depicted in FIGS. 8A and 8B.

The radar 10 consists of a transmit section 50 and a receive section 70. The transmit section 50 shown in FIG. 8A is connected to the 16-BIT Digital to Analog Converter (DAC) 16 in the computer 14. The DAC 16 connects to the low pass filter (LPF) 51 which is connected to provide its ramp output to the YIG oscillator 20. The YIG oscillator 20 connects its output to the 3-way power divider 53 which provides one of its outputs to the 10 dB coupler 22, a second output to the 50 ohm load 54 and its third output to the mixer 30 LO input via the 10 dB coupler 81 in the receive section 70. The coupler 22 connects in the hardware gating section 55 to the bandpass filter 56 and couples a portion of its input to the switch 60 which connects to the reference circuit 24 and the 50 ohm load 61. The output of the reference circuit 24 connects to the reference circuit switch 28 in the receive section 70 shown in FIG. 8B. The bandpass filter 56 connects its output to the switch 57 which connects to a second bandpass filter 58. The BPF 58 connects to the power amplifier 59. The output of the power amplifier 59 connects the transmit horn through appropriate RF connecting devices not part of the present invention. The circulator and antenna are external to the transmit section 50 of the invention.

The receive section 70 is connected to a receive horn through appropriate RF connecting devices. The received signal is fed to the low noise amplifier (LNA) 72. The LNA 72 connects to the variable attenuator 73, the output of which is connected to the amplifier 74. The output of the amplifier 74 connects in the hardware gating section 75 to the bandpass filter 76 which connects its output to the switch 77. The output switch 77 is connected to the bandpass filter 78 which in turn connects its output to switch 28. The output of switch 28 connects to the YIG tracking filter 80 which also obtains a YIG reference signal as an input from the 10 dB coupler 81. The output of the YIG tracking filter 80 is connected as the RF input to the mixer 30 which receives an LO input via the coupler 81 from the transmit section 50. The IF output of the mixer 30 is input to IF processing circuitry 83 known to those skilled in the art and from there fed to the analog to digital converter 18 in the computer 14.

The computer 14 used in a preferred embodiment of the present invention was a Dell Powerline 486 EISA Personal Computer. The analog to digital converter (ADC) 18 installed in the computer 14 was a 12 bit National Instruments EISA A2000. The 16 bit digital to analog converter (DAC) 16 installed in the computer 14 was a National Instruments AT-MIO-16X. The GPIB was a National Instruments AT-GPIB. The YTO 20 was a Ferretec 2-8 and 6-18 GHz unit with analog drivers.

It is thought that the present invention and many of its attendant advantages will be understood from the foregoing description and it will be apparent that changes may be made in the form, construction and arrangement of the elements employed in implementing the methodology without departing from the spirit and scope of the invention or sacrificing all of its material advantages, the forms hereinbefore describe being merely exemplary embodiments thereof.

What is now claimed is:

1. An apparatus for accurately performing radar cross-section measurements, said apparatus having an antenna with a transmit channel and a receive channel, and comprising:

a YIG oscillator;

a means for providing a reference frequency response to a portion of signal bandwidth of interest from said YIG oscillator and to a laboratory standard resonant circuit, said responses having at least one null in each portion;

a means having an input contact and first and second output contacts, for switching an RF signal from said YIG oscillator to said reference means or to said antenna transmit channel;

a means having an output contact and a first and second input contacts for switching an RF signal from said antenna receive channel connected to said first contact or from said reference providing means connected to said second contact to said switching means output contact;

a means for mixing a portion of said RF signal from said YIG oscillator as a local oscillator signal and an RF signal via said switch output contact from said reference providing means or said antenna receive channel to produce an intermediate frequency (IF) signal;

a means having an input connected to the output of said YIG oscillator, for coupling a first portion of said YIG oscillator output to said first switching means, and a second portion of said YIG oscillator output to said means for mixing as a local oscillator input; and computer means comprising:

means for storing predetermined frequency response data for said YIG oscillator;

means for supplying a compensating tuning voltage to said YIG oscillator in accordance with said stored predetermined frequency response to linearize the output of said oscillator;

means for providing for programmable capture of user-selected segments of said IF waveform;

means for producing a sample delay signal for input to said means for supplying a compensating tuning voltage;

means for storing and comparing said null-containing reference frequency responses from said YIG oscillator and said laboratory standard resonant circuit to produce frequency drift compensation signals to said sample delay means, and means for producing coherent RCS information from said intermediate frequency signal.

2. The apparatus of claim 1 wherein said means for providing a reference response is a resonant circuit configured as a coaxial "T" accommodating the input and output at opposite ends of the horizontal top leg of the "T" with isolators and the vertical leg of the "T" comprising a stub having a short at the end opposite it's connection with the top leg of the "T" and sized to produce at least one null in the frequency bandwidth of interest.

3. The apparatus of claim 1 wherein said means for coupling is a directional RF coupler.

4. The apparatus of claim 1 wherein said means for supplying compensating tuning voltage further comprises:

a programmable digital to analog converter; and a predetermined data base of compensating data for use by said computer in driving said DAC to produce a linear YIG oscillator sweep.

5. The apparatus of claim 1 wherein said means for providing capture of user-selected segments of said IF waveform and producing a sample delay signal for input to said means for supplying a compensating tuning voltage further comprises;

a programmable analog to digital converter; and a digitally implemented capture and delay algorithm.

6. The apparatus of claim 1 wherein said means for producing coherent RCS information comprises a means for performing a Fast Fourier Transform of said analog to digital converter output data from said antenna receive channel.

7. The apparatus of claim 5 wherein said programmable means for capturing segments of said IF waveform and correcting any oscillator frequency drift is an analog to digital converter.

8. The method of characterizing the frequency sweep signature of a YIG-tuned oscillator (YTO) in a laboratory setup employing a digital computer having a GPIB interface and a digital to analog converter, a modulation domain analyzer (MDA), a microwave frequency synthesizer, and a mixer, comprising the steps of;

a. installing the YTO on an appropriate heat sink for testing under thermal conditions similar to its normal operating environment;

b. tuning the YTO at its normal operating speed over individual frequency sweep segments in succession until the entire bandwidth is swept using a linear voltage ramp from the digital to analog converter in said computer;

c. down-converting each segment of the sweep prior to its input to the MDA;

d. measuring the oscillator output frequency during each sweep segment using said modulation domain analyzer;

e. recording the frequency and the frequency versus time data output from the MDA for each sweep segment in the computer after receiving the data via the GPIB interface in the computer;

f. repeating steps b-e above until MDA data for each sweep segment comprising the entire bandwidth of the oscillator is obtained and stored in the computer;

g. comparing in said computer the recorded data to an ideal frequency ramp, computing the difference between the recorded data and the ideal frequency ramp, and computing from said difference the digital data representing the non-linear sequence of DAC output levels; and h. storing the digital data representing the non-linear sequence of DAC output levels, and the frequency versus time data from the MDA in a file of digital data associated with said oscillator.

9. The method of accurately performing radar cross-section measurements using an apparatus having a highly linear and accurate chirp waveform comprising the steps of:

Step 1. selecting a YIG tuned oscillator having the linearity and frequency accuracy characteristics closest to those desired for the particular measurements;

Step 2. subjecting said oscillator to a bench characterization using a laboratory reference frequency source to determine the frequency response and drift of said oscillator;

Step 3. creating, using a digital computer, a lookup table of digitized data representing the difference between the frequency response of said oscillator as measured using the laboratory reference frequency source and a computer-generated ideal linear response for linearity compensation of said YTO during RCS use;

Step 4. using a reference resonant circuit having a number of nulls in its frequency response, with at least one null in each portion or band over which data is being taken in the frequency range of interest, carefully measuring the frequency response of said circuit on a laboratory network analyzer and recording the nulls and the frequencies at which they occur;

Step 5. digitizing the frequency and null data collected in Step 4 and storing same in said computer;

Step 6. installing the YTO in a homodyne radar for illuminating a target and measuring its RCS;

Step 7. retrieving said digital lineraity compensation data from Step 3 and said digital frequency and null data from Step 5;

Step 8. converting said digital signals retrieved in Step 7 to analog form; and

Step 9. using the appropriate analog null signal to initiate the YTO sweep and correct for frequency and using the analog linearity compensation signal to drive said YTO to which it uniquely applies to produce a corrected linear output throughout the RCS measurements using said YTO.

10. The method of claim 9 wherein the steps of creating said lookup table of digitized data comprises the steps of:

a. digitizing the frequency response data measured for said oscillator in Step 2;

b. subtracting said digitized YTO frequency response from said computer-generated linear response to obtain the data to compensate for YTO non-linearities; and storing said compensation data in said computer.

* * * * *